(12) United States Patent  
Cocalis et al.

(10) Patent No.: US 8,075,009 B2
(45) Date of Patent: Dec. 13, 2011

(54) SUSPENSION BICYCLE DERAILLEUR LINK

(76) Inventors: Chris Cocalis, Phoenix, AZ (US); Kevin Tisue, Phoenix, AZ (US)

(*) Notice: Subject to any disclaimer, the term of this patent is extended or adjusted under 35 U.S.C. 154(b) by 128 days.

(21) Appl. No.: 12/561,214

(22) Filed: Sep. 16, 2009

(65) Prior Publication Data

US 2010/0127473 A1    May 27, 2010

Related U.S. Application Data

(60) Provisional application No. 61/097,623, filed on Sep. 17, 2008.

(51) Int. Cl.
*B62K 25/28* (2006.01)
(52) U.S. Cl. ........................................... 280/284
(58) Field of Classification Search .............. 280/257, 280/260, 277, 284, 285, 286, 283
See application file for complete search history.

(56) References Cited

U.S. PATENT DOCUMENTS

| | | | | |
|---|---|---|---|---|
| 6,843,494 B2* | 1/2005 | Lam | | 280/284 |
| 6,880,847 B2* | 4/2005 | Chamberlain et al. | | 280/284 |
| 6,969,081 B2* | 11/2005 | Whyte | | 280/284 |
| 7,059,620 B2* | 6/2006 | Chamberlain et al. | | 280/284 |

* cited by examiner

*Primary Examiner* — Tony H. Winner
(74) *Attorney, Agent, or Firm* — Parsons & Goltry; Robert A. Parsons; Michael W. Goltry

(57) ABSTRACT

Bicycle derailleur mounting apparatus for use with a suspension bicycle including a front triangle and a rear triangle coupled to allow limited relative pivotal movement or travel therebetween during operation. The apparatus includes a derailleur link having a derailleur mounted thereon. Mounting structure mounts the derailleur link relative to one of the front triangle and the rear triangle to move independently of the front triangle and the rear triangle during travel. The independent movement is driven as a function of travel position of the front triangle and the rear triangle. The mounting structure is designed to position the derailleur to maintain shifting performance, to maintain chain retention, and to maintain good front derailleur to chainstay clearance, at desired points along the travel.

10 Claims, 12 Drawing Sheets

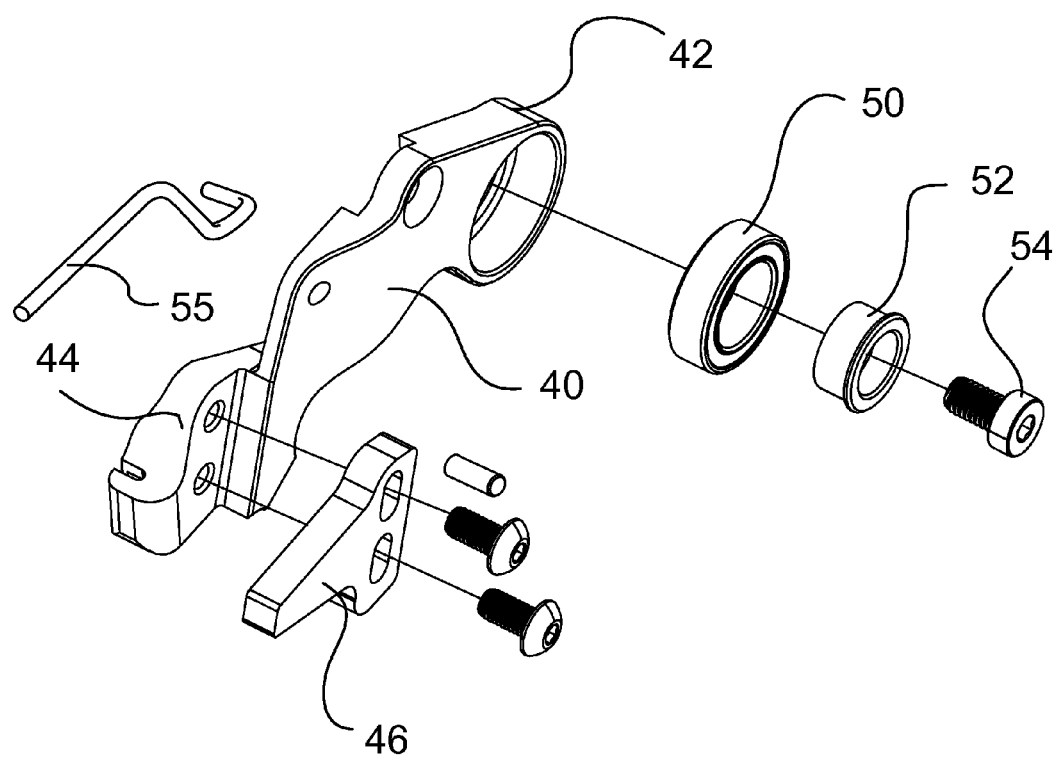
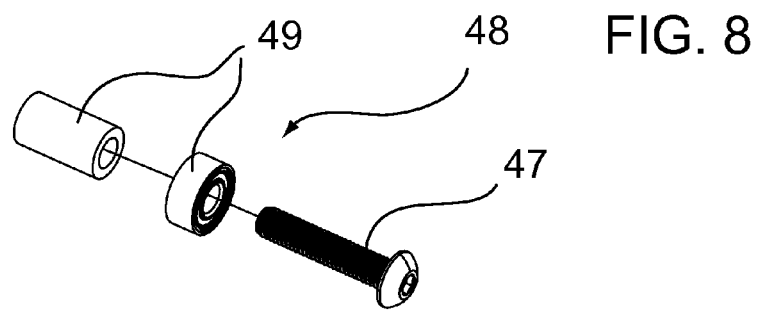
FIG. 8

SUSPENSION BICYCLE DERAILLEUR LINK

CROSS-REFERENCE TO RELATED APPLICATIONS

This application claims the benefit of U.S. Provisional Application No. 61/097,623, filed 17 Sep. 2008.

FIELD OF THE INVENTION

This invention relates to bicycles with suspension coupled front and rear triangles and more specifically to derailleurs fixed to suspension bicycles.

BACKGROUND OF THE INVENTION

Bicycles including a front triangle and a rear triangle (suspension bicycles) coupled for pivotal movement during operation, are well known in the art. Generally, in bicycles of this type the frame is formed of two components, a front triangle and a rear triangle, that are pivotally coupled with shock-absorbing type cylinders connected therebetween to allow limited relative pivotal movement. Relative movement between the front and rear triangles during use is generally referred to as suspension movement or travel. One purpose of the pivotal movement is to smooth the ride during high stress rides such as cross-country travel, mountain biking, etc.

A major problem that occurs in suspension bicycles is that as the rear triangle and/or front triangle move relative to each other, the drive chain can move several inches from its normal position. Thus, the position of the chain relative to the chainstay and the derailleur shifts substantially and can in some instances move sufficiently to impair operation of, or damage the derailleur.

It would be highly advantageous, therefore, to remedy the foregoing and other deficiencies inherent in the prior art.

Accordingly, it is an object the present invention to provide a new and improved suspension bicycle derailleur mounting apparatus for movably mounting the derailleur.

It is another object of the present invention to provide a new and improved suspension bicycle derailleur mounting apparatus for movably mounting the derailleur to maintain shifting performance, to maintain chain retention, and to maintain good front derailleur to chainstay clearance at desired points along the travel.

It is another object of the present invention to provide a new and improved suspension bicycle derailleur mounting apparatus for movably mounting the derailleur that produces a shorter drop in drive side chainstay in order to clear the front derailluer cage through travel and allows for a stronger lighter frame design.

Another object of the present invention to provide a new and improved suspension bicycle derailleur mounting apparatus for movably mounting the derailleur that allows a wider range of rear suspension pivot locations.

Yet another object of the present invention is to maintain chain retention at desired points along the travel.

SUMMARY OF THE INVENTION

Briefly, to achieve the desired objects of the instant invention in accordance with a preferred embodiment thereof, bicycle derailleur mounting apparatus is disclosed. The apparatus is designed for use with a suspension bicycle that includes a front triangle and a rear triangle coupled to allow limited relative pivotal movement or travel therebetween during operation and a drive chain mounted between a drive sprocket on the front triangle and a rear wheel mounted on the rear triangle. The drive chain moves vertically during relative pivotal movement or travel between the front triangle and the rear triangle. The apparatus includes a derailleur link having a derailleur mounted thereon. Mounting structure mounts the derailleur link relative to one of the front triangle and the rear triangle to move independently of the front triangle and the rear triangle during travel. The independent movement is driven as a function of travel position of the front triangle and the rear triangle. The mounting structure is designed to pivot the derailleur link so as to maintain the derailleur substantially at a uniform orientation relative to the drive chain whereby the derailleur is positioned in such a way as to maintain shifting performance, to maintain chain retention, and to maintain good front derailleur to chainstay clearance, at desired points along the travel.

The desired objects of the instant invention are further realized in accordance with another embodiment thereof, including a suspension bicycle having a front triangle and a rear triangle coupled to allow limited relative pivotal movement or travel between the front triangle and the rear triangle during operation. A derailleur link has a derailleur mounted thereon and mounting structure mounts the derailleur link relative to one of the front triangle and the rear triangle to move independently of the front triangle and the rear triangle during travel. The independent movement is driven as a function of travel position of the front triangle and the rear triangle and the mounting structure is designed to position the front derailleur in such a way as to maintain shifting performance, to maintain chain retention, and to maintain good front derailleur to chainstay clearance at desired points along the travel.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 8 is an enlarged exploded view of the derailleur link of FIG. 2;

DETAILED DESCRIPTION OF THE DRAWINGS

Figure 1:
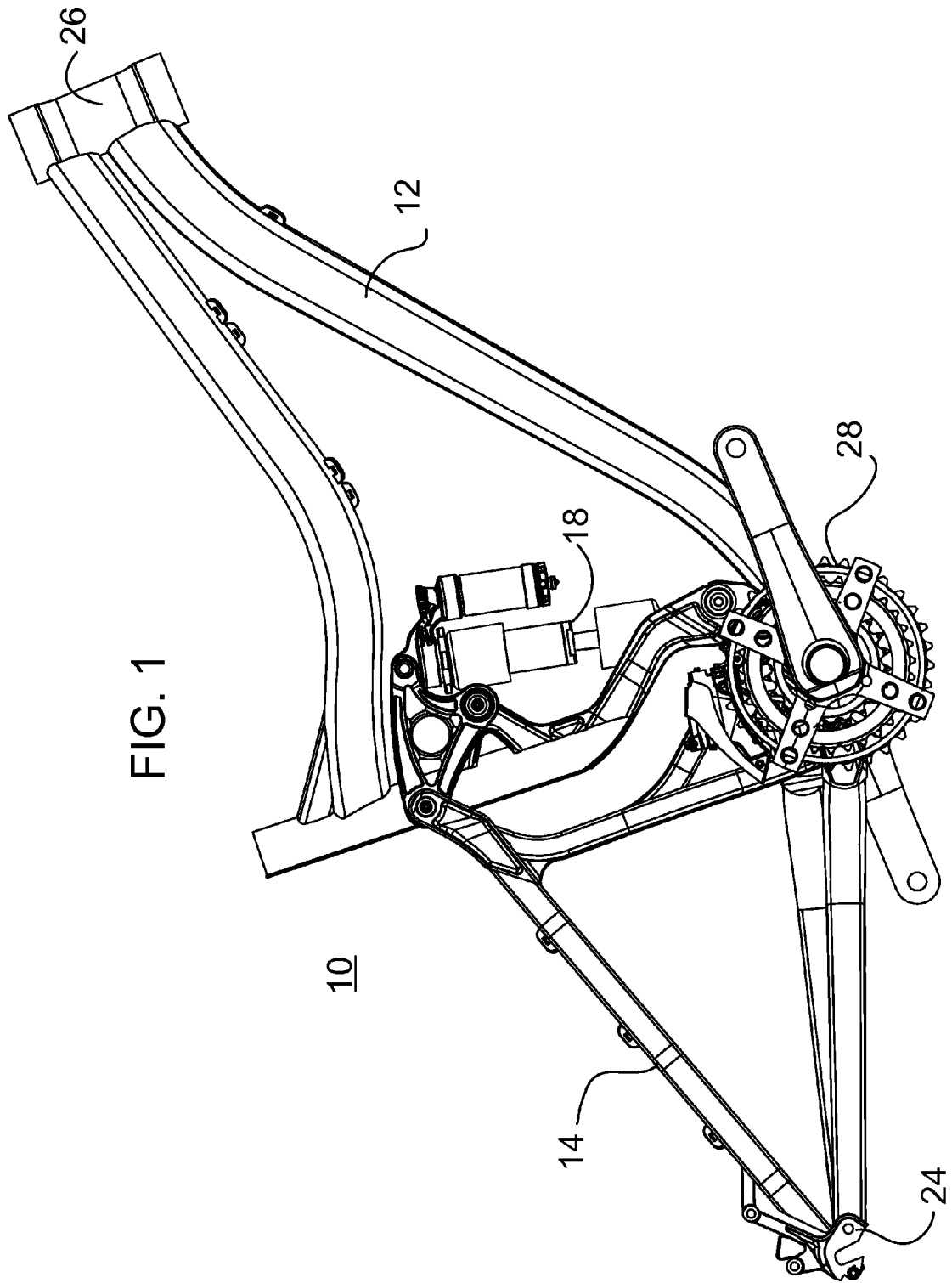
FIG. 1 is a side view of the frame of a suspension bicycle.
Figure 2:
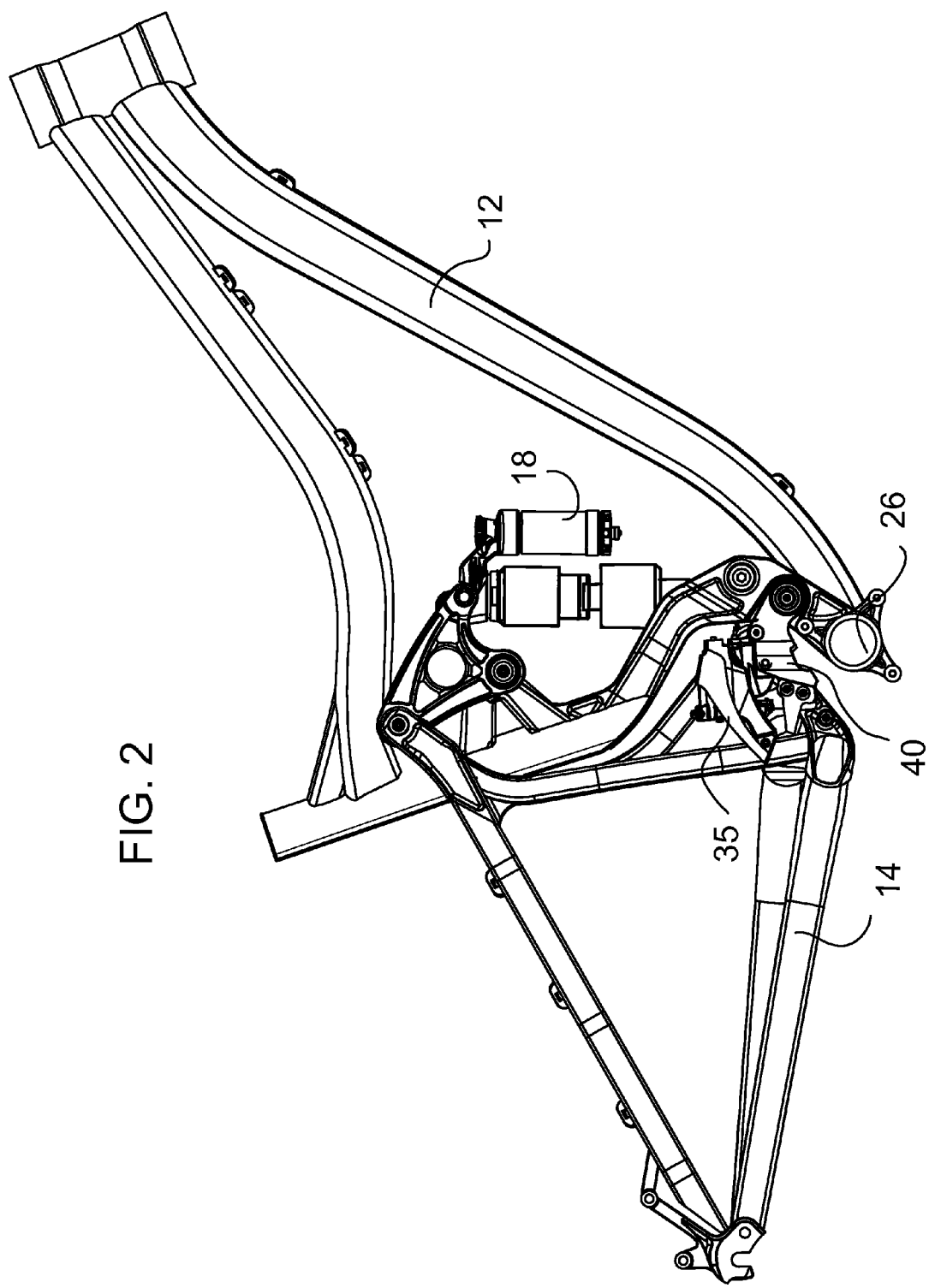
FIG. 2 is a side view of the frame of a suspension bicycle with a front triangle mounted embodiment of a derailleur and derailleur link in accordance with the present invention.
Figure 6:
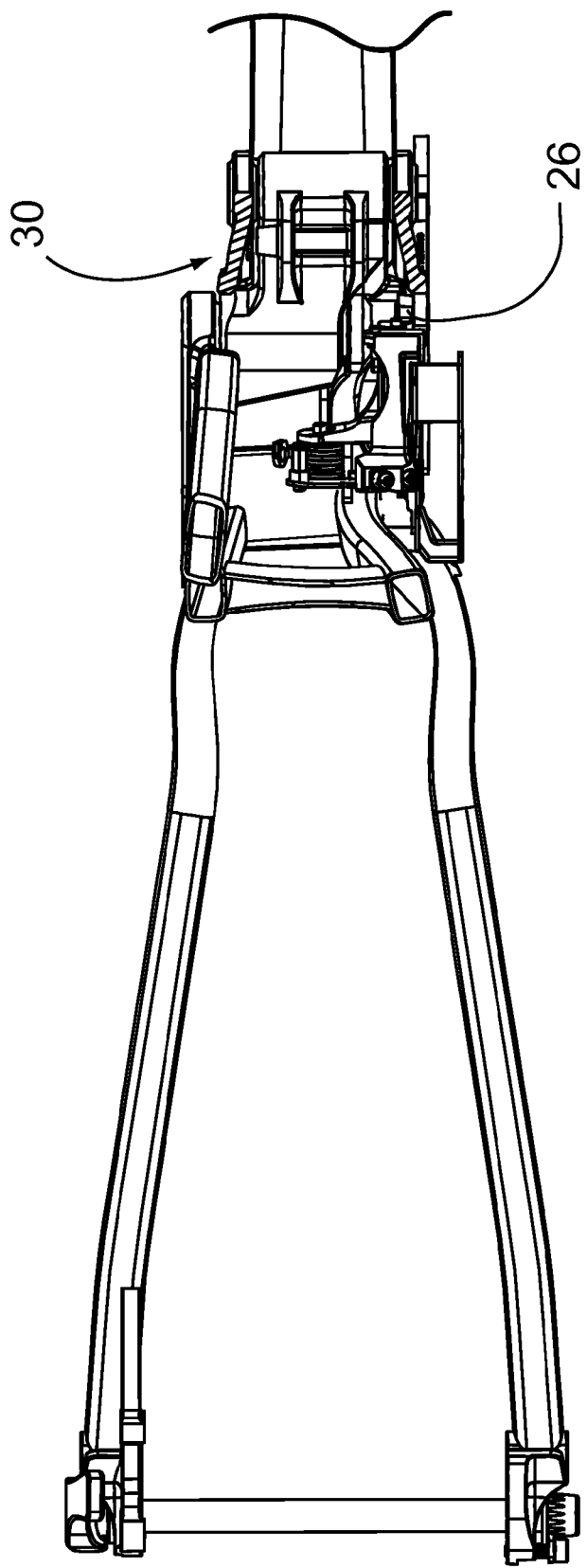
FIG. 6 is an enlarged top view of the derailleur and derailleur link of FIG. 2 portions thereof removed to better illustrate components.

Turning to FIG. 1, a side view of the frame 10 of a suspension bicycle is illustrated. Frame 10 includes a front triangle 12 and a rear triangle 14 pivotally connected adjacent lower angles or points thereof. An upper point of the front triangle 12 and rear triangle 14 are coupled together for limited pivotal movement by one or more shock-absorbing type cylinders 18. The front point of front triangle 12 includes a hub 20 for mounting a front wheel and handle bars (not shown) in a well known manner. The rear end of rear triangle 14 includes a connector 24 for mounting a rear wheel (not shown) in a well known manner. Referring to FIG. 2, it can be seen that the lower angle or point of the front triangle includes a hub 26 for mounting driving sprockets 28. Also, the lower point of rear triangle 14 is pivotally attached, generally with an intermediate link, at a junction point 30 adjacent the lower point of front triangle 12 (see FIGS. 3 and 6). The pivotal coupling and shock-absorbing type cylinders 18 allow relative pivotal movement, generally around the junction point 30 adjacent mounting driving sprockets 28.

However, because driving sprockets 28 are mounted at the lower point of front triangle 12 and pivot point 30 is spaced from this point it will be seen that the chain connecting sprockets 28 to the rear wheel (See FIGS. 9 and 10) will move substantially relative to any frame components (e.g. the chainstay) when rear triangle 14 pivots relative to front triangle 12. Thus, the orientation of the chain relative to a fixedly positioned drive side chainstay and derailleur will change substantially and alter the shifting performance throughout the suspension travel.

Figure 3:
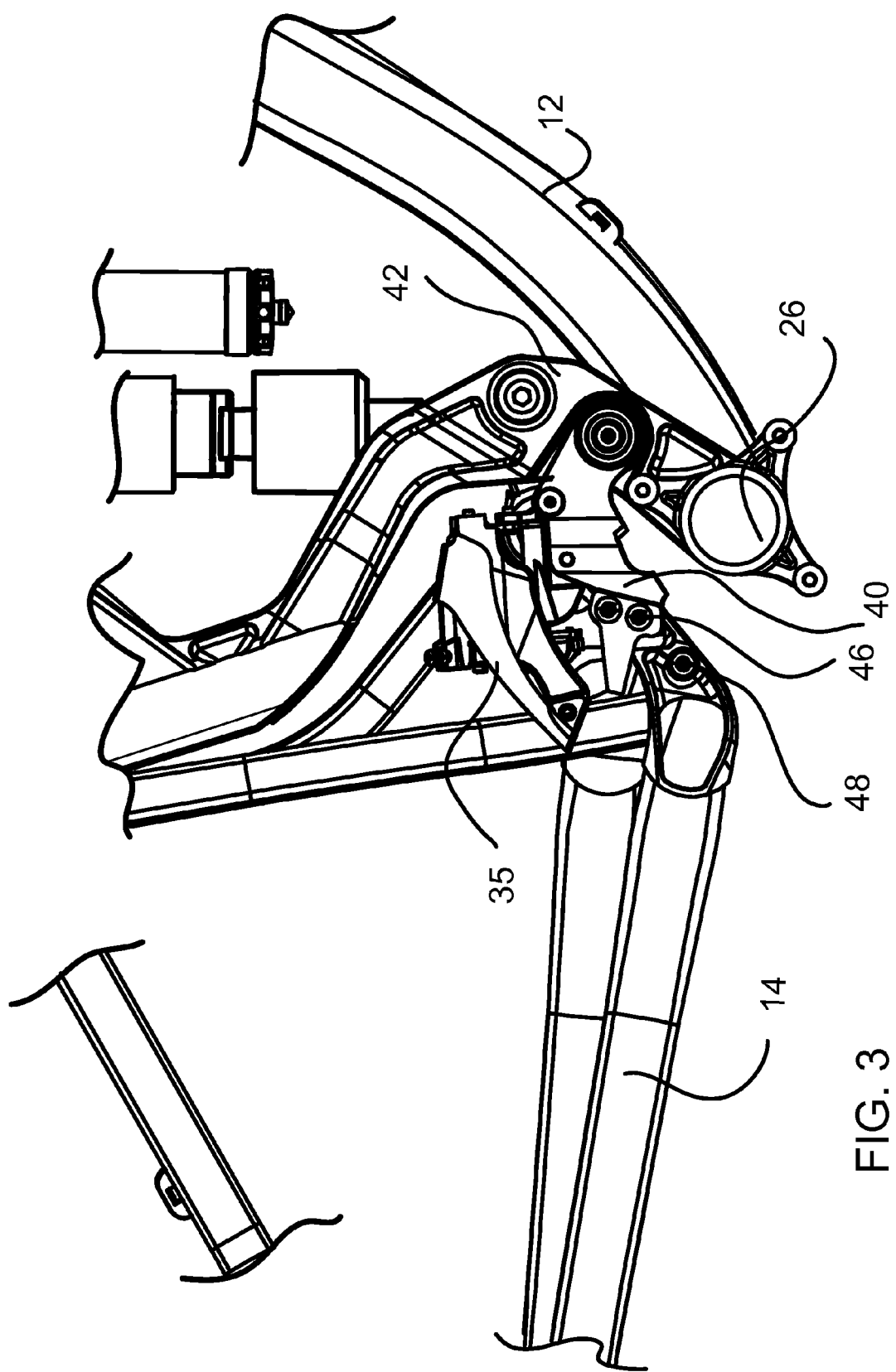
FIG. 3 is an enlarged side view of the derailleur and derailleur link of FIG. 2, with the frame of the suspension bicycle in a substantially normal orientation, portions thereof removed.
Figure 4:
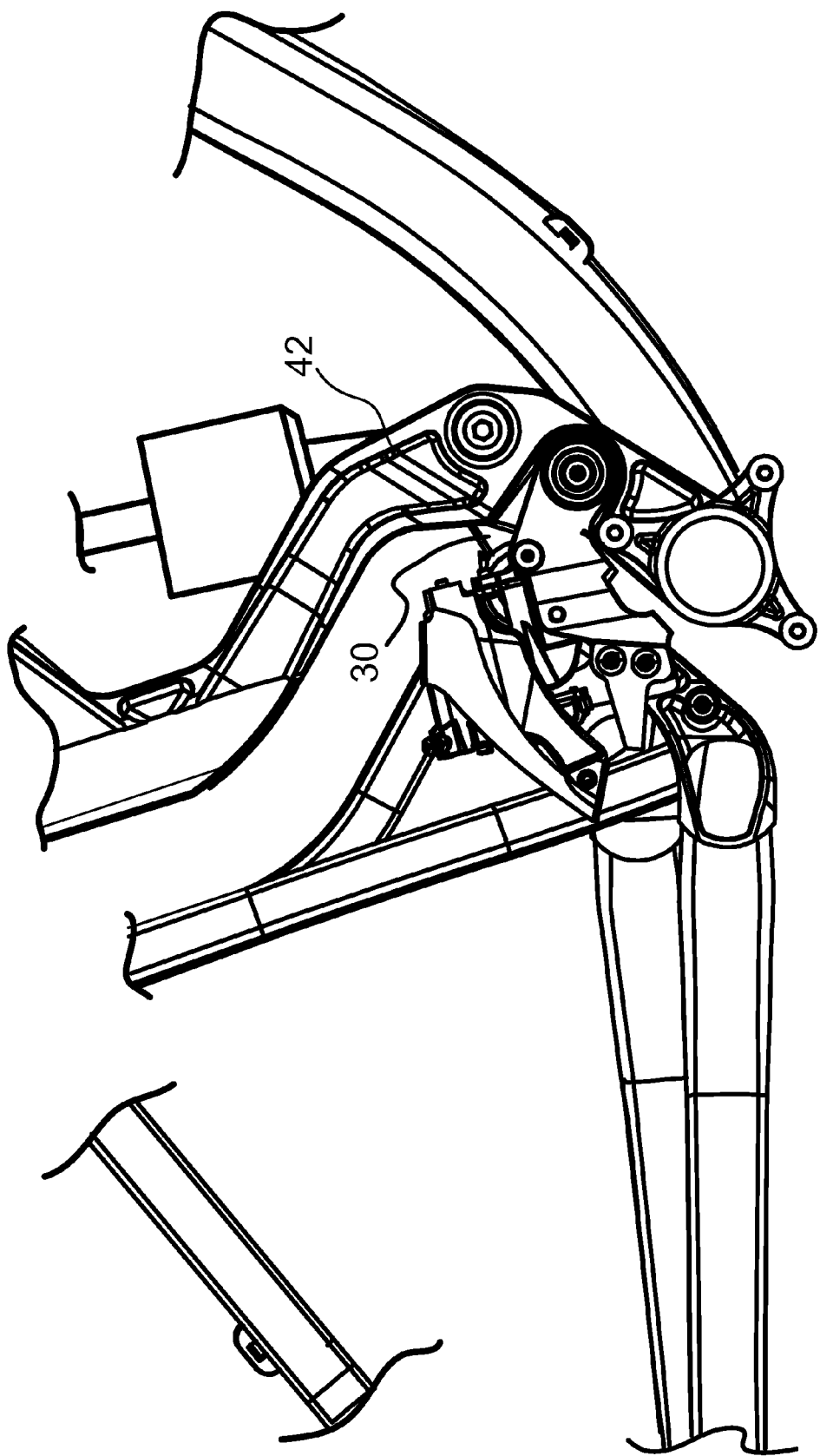
FIG. 4 is an enlarged side view of the derailleur and derailleur link of FIG. 2, with the frame of the suspension bicycle in the substantially normal orientation, portions thereof removed.
Figure 5:
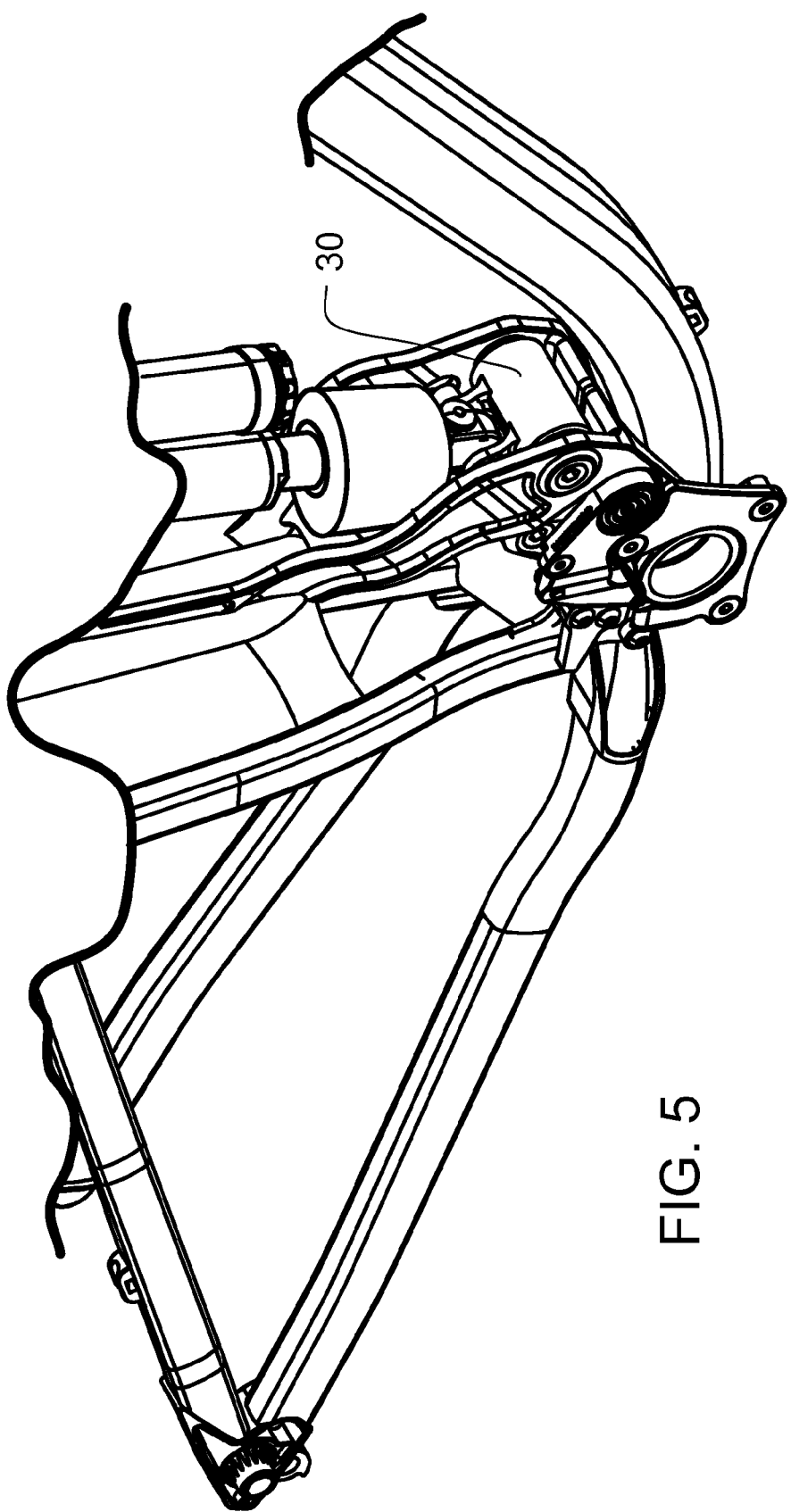
FIG. 5 is an enlarged front view of the derailleur and derailleur link of FIG. 2, with the frame of the suspension bicycle in the substantially normal orientation, portions thereof removed.

Turning now to FIGS. 2 and 3 a derailleur 35 is illustrated in a normal position adjacent the rear triangle 14. Derailleur 35 is a standard piece of equipment the operation of which is well known in the art and will not be discussed in further detail herein. Derailleur 35, in this embodiment, is pivotally mounted by a derailleur link 40 to front triangle 12. One embodiment of derailleur link 40 is illustrated in accordance with the present invention. In this embodiment, derailleur link 40 is an elongated link having one end 42 pivotally coupled to one of the upright braces 41 of front triangle 12 adjacent to pivot point 30 and hub 26. The opposite or rear end 44 of derailleur link 40 is constructed for attachment to derailleur 35 so as to pivotally mount derailleur 35 in position relative to the driving chain (not shown). The relative positions of derailleur 35 and derailleur link 40 can be seen in more detail in FIGS. 4 through 6. Also, a finger shaped, follower 46 is affixed to the rear end 44 of link 40 in a rearwardly extending position. An actuator 48 is affixed to rear triangle 14 for engaging follower 46 and providing pivotal movement of derailleur link 40 and attached derailleur 35 from a normal position during suspension travel of frame 10.

Figure 7:
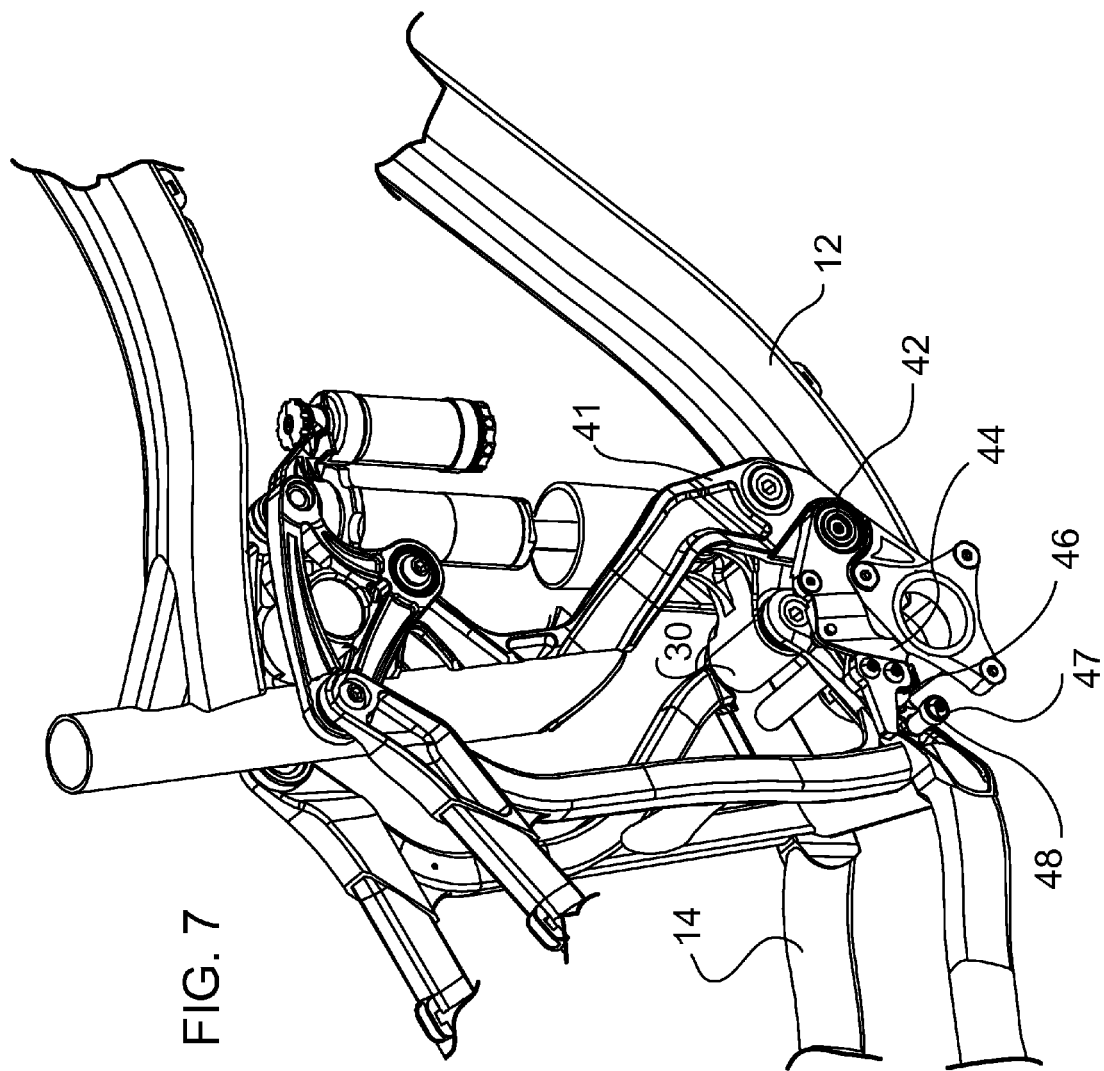
FIG. 7 is an enlarged perspective view of the derailleur link of FIG. 2 with the derailleur shown in phantom and the frame of the suspension bicycle in a substantially normal orientation, portions thereof removed.

Referring additionally to FIGS. 7 and 8 the specific design of this embodiment of derailleur link 40 can be seen in detail. Link 40 is pivotally coupled to upright brace 41 of front triangle 12 by means of a ball bearing 50 nested in a depression in end 42 of derailleur link 40 and affixed to upright brace 41 of front triangle 12 by a bearing cap 52 and a bolt 54. Thus, derailleur link 40 is free to pivot about bolt 54 on ball bearing 50. Actuator 48 includes a bolt (pivot pin) 47, with a bearing and bearing spacer 49 rotatably positioned thereon, engaged in a strut of rear triangle 14 so to extend outwardly therefrom. Follower 46 affixed to rear end 44 of derailleur link 40 is engaged by actuator 48 during suspension travel of frame 10. Derailleur link 40 is biased into a normal orientation by means of a spring 55, shown in FIG. 8. Derailleur link 40 is illustrated substantially in the normal orientation in FIGS. 4 and 7.

In this specific embodiment, follower 46 is formed of a relatively hard plastic but may be constructed of any convenient material that will bear against, or follow, actuator 48 during suspension travel of frame 10. Bearing and bearing spacer 49 provide substantially friction free rotation to minimize wear and improve the following operation. Even though follower 46 experiences relatively low friction during operation, it is constructed and attached for easy replacement.

Turning again to FIGS. 2 and 3, it can be seen that actuator 48 is engaging follower 46 so that link 40 and derailleur 35 are rotated upwardly by actuator 48 during extensive suspension travel of frame 10. As explained above, when frame 10 experiences extensive suspension travel, i.e. one or both of front triangle 12 and rear triangle 14 pivot upwardly about pivot point 30, the chain moves substantially relative to the derailleur (if the derailleur is fixedly mounted as in the prior art). This relative chain movement reduces shifting performance and can actually damage the derailleur. As can be seen in FIGS. 2 and 3, front triangle 12 and rear triangle 14 have rotated upwardly about pivot point 30 so that follower 46 has been moved upwardly by actuator 48. The upward movement of follower 46 pivots derailleur link 40 and derailleur 35 upwardly to maintain a more uniform position or orientation relative to the chain. That is, in the more uniform position or orientation, the chain and derailleur are close to or substantially in the same relative position as they are in the normal orientation.

Figure 9:
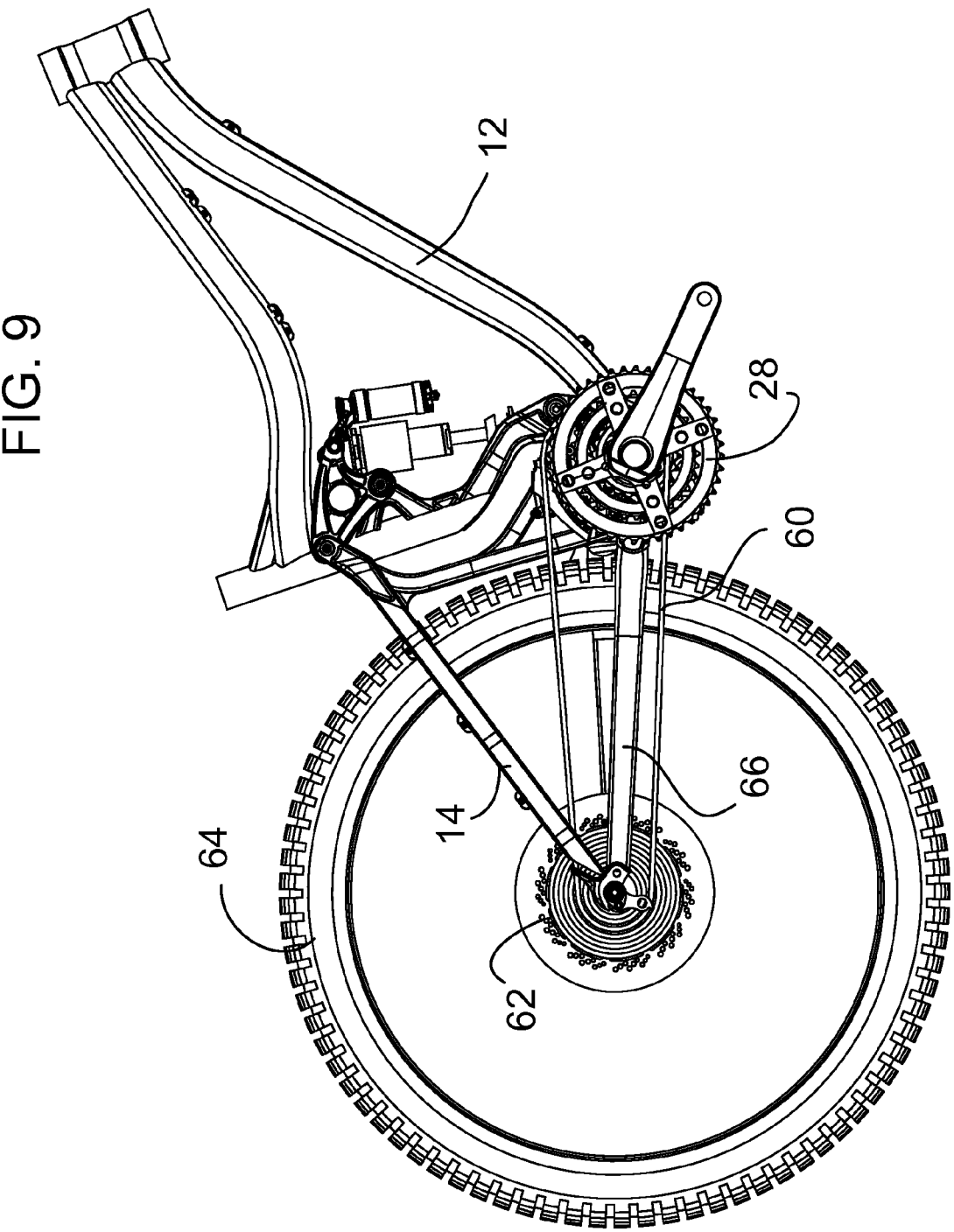
FIG. 9 is a side view of a suspension bicycle in a substantially normal orientation, portions thereof removed.
Figure 10:
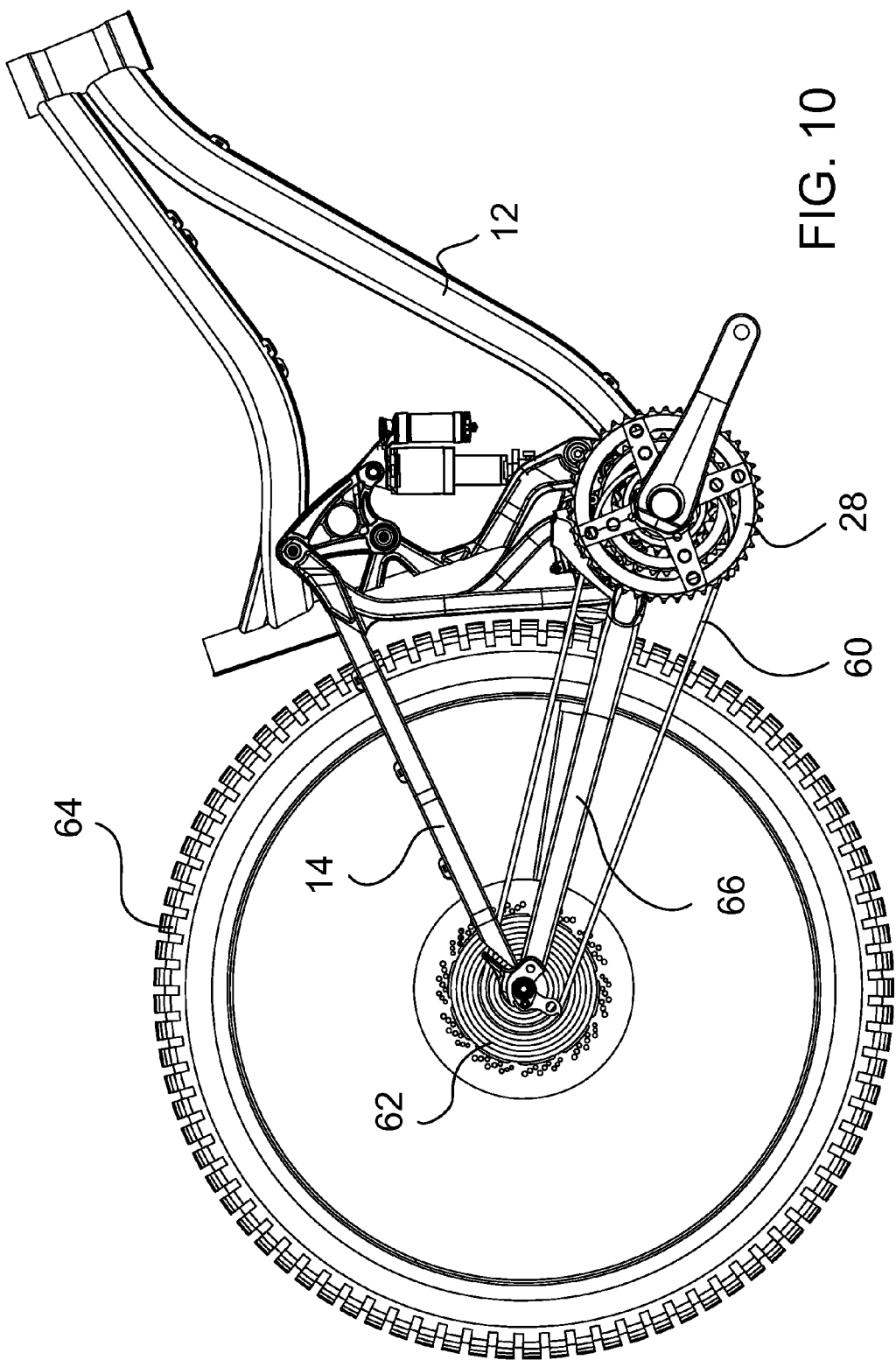
FIG. 10 is a side view of a suspension bicycle in a pivoted or travel orientation, portions thereof removed.

Referring specifically to FIGS. 9 and 10, a suspension bicycle is illustrated in a substantially normal orientation and in a pivoted or travel orientation, respectively. In both of these figures a drive chain 60 is operatively engaged with driving sprocket 28 on front triangle 12 and the hub 62 of a rear wheel 64 rotatably mounted on rear triangle 14. Also, the relative positions of drive chain 60 and chainstay 66 is illustrated. It can be seen that drive chain 60 moves vertically during relative pivotal movement or travel between front triangle 12 and rear triangle 14 and that the orientation of chain 60 relative to fixedly positioned drive side or lower side of chainstay 66 and derailleur 35 will change substantially. It can also be seen from these figures that as travel or relative movement between front triangle 12 and rear triangle 14 occurs derailleur link 40 pivots so as to maintain derailleur 35 substantially at the same or a more uniform orientation, relative to the chain. Thus, the movement of the link and derailleur are driven as a function of travel position. Also, it can be seen that the pivoting of derailleur link 40 and attached derailleur 35 maintains good front derailleur to chainstay clearance.

It can be seen that during the downward or upward relative rotation of front triangle 12 and rear triangle 14, derailleur link 40 will pivot so as to maintain derailleur 35 substantially at the same or a more uniform orientation, relative to the chain. Thus, good shifting performance will be maintained throughout the suspension travel. Also, there will be a shorter drop in drive side chainstay in order to clear derailleur 35 and derailleur link 40 through suspension travel, which allows for a stronger lighter frame design. Further, new and improved derailleur link 40 with derailleur 35 attached allows a wider range of rear suspension pivot locations, i.e pivot point 30.

Figure 11:
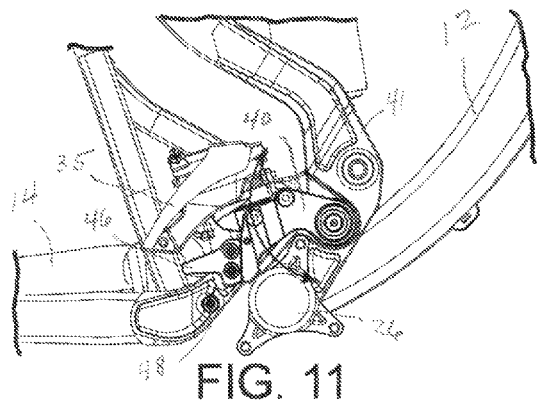
FIGS. 11 through 22 illustrate a suspension bicycle with different embodiments of a derailleur and derailleur link in accordance with the present invention.
Figure 12:
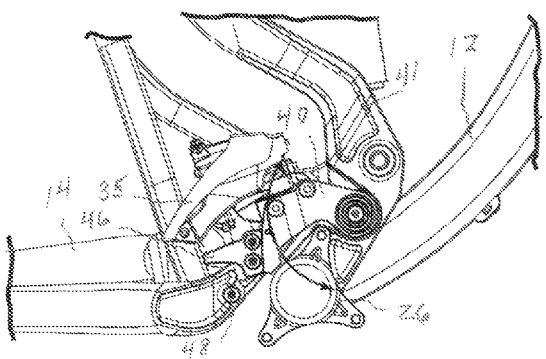
Figure 13:
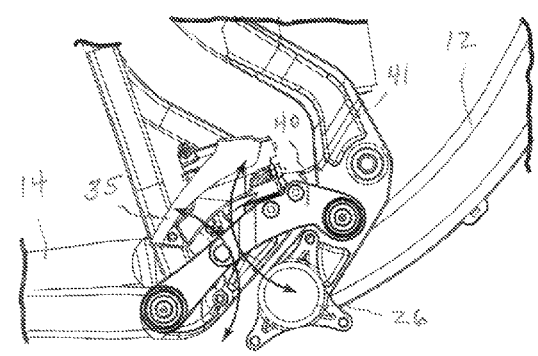
Figure 14:
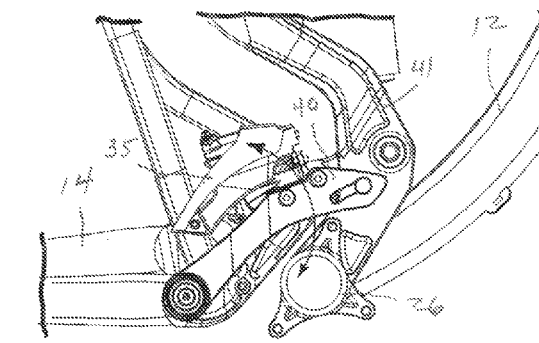
Figure 15:
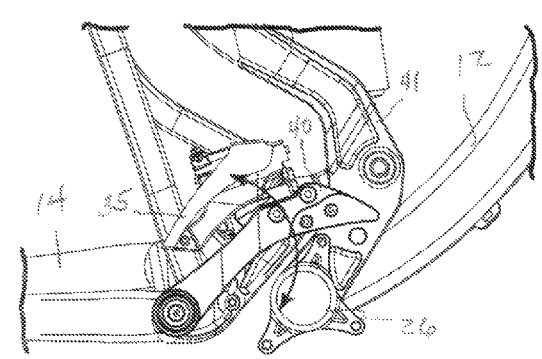
Figure 16:
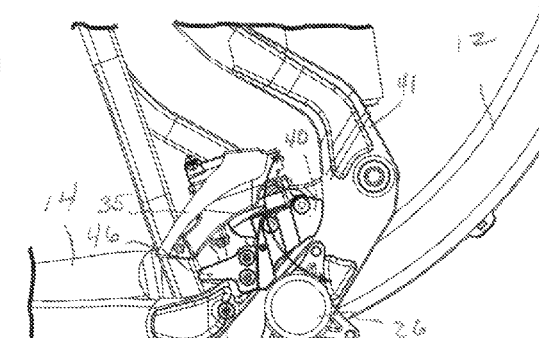
Figure 17:
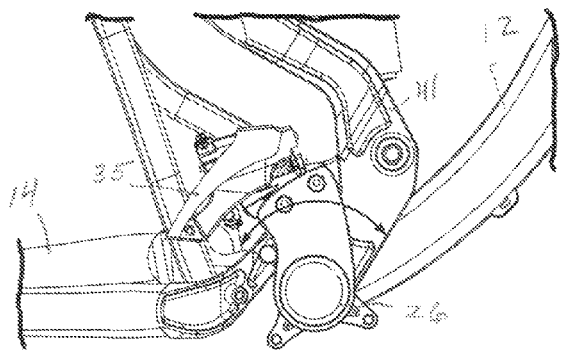
Figure 18:
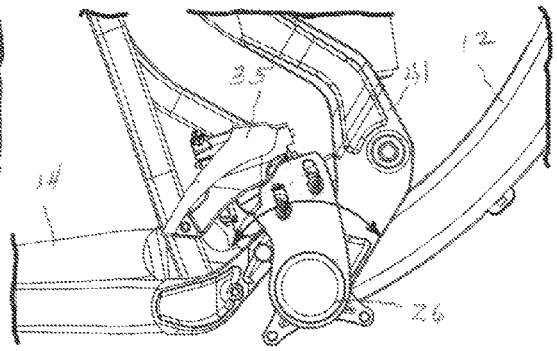
Figure 19:
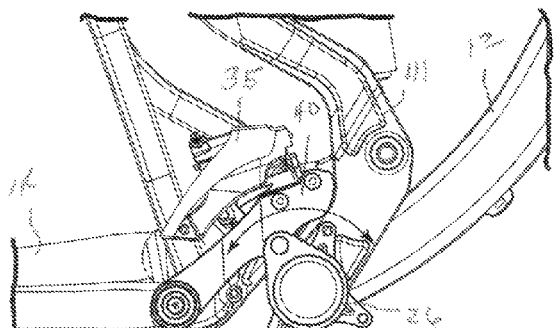
Figure 20:
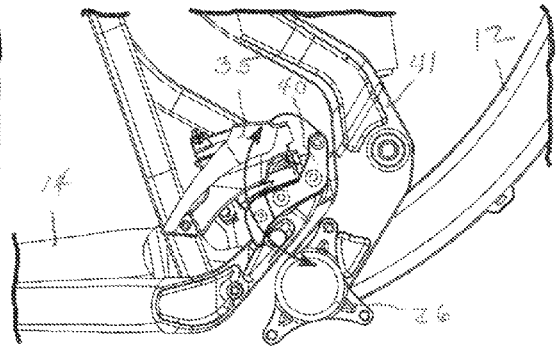
Figure 21:
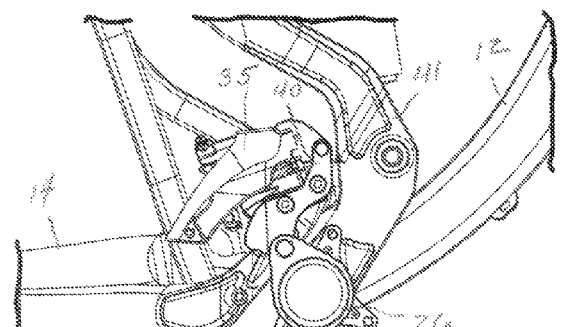
Figure 22:
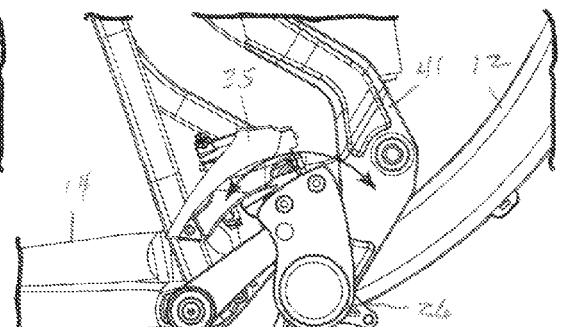

Referring to FIGS. 11-21, a plurality of different embodiments are illustrated. In FIG. 11, the preferred embodiment of FIGS. 2-8 is illustrated with a slightly more detailed view of derailleur 35 and derailleur link 40. FIG. 12 illustrates a similar embodiment with a carved plastic contact that alters the rate of movement. FIG. 13 illustrates a scissor style derailleur link having a rear end pivotally attached to the rear triangle and a front end pivotally attached to the front triangle. This specific derailleur link pivots upwardly or downwardly in the middle and does not use a follower/actuator. FIG. 14 illustrates an embodiment of a derailleur link that is pivotally coupled at the rear end to rear triangle 14 and has an actuator pin engaged in a follower slot at the front end. FIG. 15 illustrates an embodiment of a derailleur link that is pivotally coupled at the rear end to rear triangle 14 and has a follower at the front end positioned to engage an actuator similar (but opposite) to the embodiment of FIG. 2. FIG. 16 illustrates an embodiment in which the derailleur link is attached to a link joining the front triangle 12 and the rear triangle 14 so as to pivot with the joining link as the front and rear triangles pivot relative to each other. FIG. 17 illustrates an embodiment in which the derailleur link is pivotally attached to the hub 26 mounting driving sprocket 28. In this embodiment the derailleur link is actuated by pivotal movement of rear triangle 14. In FIG. 18 a derailleur link similar to that illustrated in FIG. 17 is shown but the derailleur is mounted on the link by a separate spring loaded carrier. In FIG. 19 a rear triangle mounted derailleur link similar to that illustrated in FIG. 15 is shown and a link pivotally attached to the hub 26 mounting driving sprocket 28 is included. FIG. 20 illustrates a derailleur link which is activated by the movement of rear triangle 14 and which includes an additional mounting point located on the main link connecting the lower portion of rear triangle 14 to the lower portion of front triangle 12. FIG. 21 illustrates a derailleur link which pivots about the center location of the hub 26 mounting driving sprocket 28 and an additional mount located on the main link connecting the lower portion of rear triangle 14 to the lower portion of front triangle 12.

It is important to note that the disclosed new and improved bicycle derailleur link mounting the derailleur allows specific and intentional movement of the derailleur during suspension travel that does not directly follow the movement of the front triangle, the rear triangle, or any suspension linkage. This independent movement can be driven by contact between different parts of the bicycle frame (e.g. front triangle, rear triangle, suspension linkages, etc.) or with linkage systems coupled between these frame components. Basically, the invention includes a derailleur mounting scheme where the derailleur is mounted to an independent link that moves separately of any other moving parts of the frame during suspension travel, the movement of the link and derailleur being driven as a function of travel position. The front derailleur mounting structure is designed to position the front derailleur so that it is driven in such a way as to maintain shifting performance, to improve chain retention, and to maintain good front derailleur to chainstay clearance at desired points along the travel.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A bicycle derailleur mounting apparatus for use with a suspension bicycle, the suspension bicycle including a front triangle and a rear triangle coupled to allow a limited relative pivotal movement or travel between the front and rear triangles during operation and a drive chain mounted between a drive sprocket on the front triangle and a rear wheel mounted on the rear triangle, the drive chain moving vertically during relative pivotal movement or travel between the front triangle and the rear triangle, the apparatus comprising:
   a derailleur link having a derailleur mounted thereon;
   a mounting structure mounting the derailleur link relative to one of the front triangle and the rear triangle to move independently of the front triangle and the rear triangle during travel, an independent movement being driven as a function of a travel position of the front triangle and the rear triangle; and
   the mounting structure being designed to pivot the derailleur link so as to maintain the derailleur substantially at a uniform orientation relative to the drive chain wherein the derailleur is positioned to maintain shifting performance at desired points along the travel.

2. The apparatus of claim 1 further including a follower associated with the derailleur link and an actuator associated with one of the front triangle and the rear triangle, the follower being positioned to engage the actuator and move the derailleur link and attached derailleur independently of the front triangle and the rear triangle during travel.

3. The apparatus of claim 2 wherein the follower includes a removable projection attached to the derailleur link to extend one of forwardly or rearwardly so as to overlie the actuator.

4. The apparatus of claim 1 wherein the mounting structure is constructed to pivotally mount the derailleur link on one of the front triangle and the rear triangle and includes a pivot pin and bearing.

5. A bicycle derailleur mounting apparatus comprising:
   a suspension bicycle including a front triangle and a rear triangle coupled to allow a limited relative pivotal movement or travel between the front triangle and the rear triangle during operation, the suspension bicycle further including a drive chain mounted between a drive sprocket on the front triangle and a rear wheel mounted on the rear triangle, the drive chain moving vertically during relative pivotal movement or travel between the front triangle and the rear triangle;
   a derailleur link having a derailleur mounted thereon;
   a mounting structure pivotally mounting the derailleur link relative to one of the front triangle and the rear triangle to move independently of the front triangle and the rear triangle during travel, an independent movement being driven as a function of a travel position of the front triangle and the rear triangle; and
   the mounting structure being designed to pivot the derailleur link so as to maintain the derailleur substantially at a uniform orientation relative to the drive chain.

6. The apparatus of claim 5 wherein the derailleur link is pivotally attached to the front triangle and includes a follower, an actuator mounted on the rear triangle engages the follower and moves the derailleur link and attached derailleur independently of the front triangle and the rear triangle during travel.

7. The apparatus of claim 6 wherein the follower includes a removable projection attached to the derailleur link to extend rearwardly so as to overlie the actuator.

8. A bicycle derailleur mounting apparatus comprising:
   a suspension bicycle including a front triangle and a rear triangle coupled to allow a limited relative pivotal movement or travel between the front triangle and the rear triangle during operation, the suspension bicycle further including a drive chain mounted between a drive sprocket on the front triangle and a rear wheel mounted on the rear triangle, the drive chain moving vertically during relative pivotal movement or travel between the front triangle and the rear triangle;

a derailleur link having a derailleur mounted thereon;

a mounting structure pivotally mounting the derailleur link on the front triangle to move independently of the front triangle and the rear triangle during travel, an independent movement being driven as a function of a travel position of the front triangle and the rear triangle; and the mounting structure being designed to pivot the derailleur link so as to maintain the derailleur substantially at a uniform orientation relative to the drive chain wherein the derailleur is positioned to maintain shifting performance at desired points along the travel.

9. The apparatus of claim 8 wherein the derailleur link includes a follower, and an actuator mounted on the rear triangle engages the follower and moves the derailleur link and attached derailleur independently of the front triangle and the rear triangle during travel.

10. The apparatus of claim 9 wherein the follower includes a removable projection attached to the derailleur link to extend rearwardly so as to overlie the actuator.

* * * * *